Patented Nov. 28, 1922.

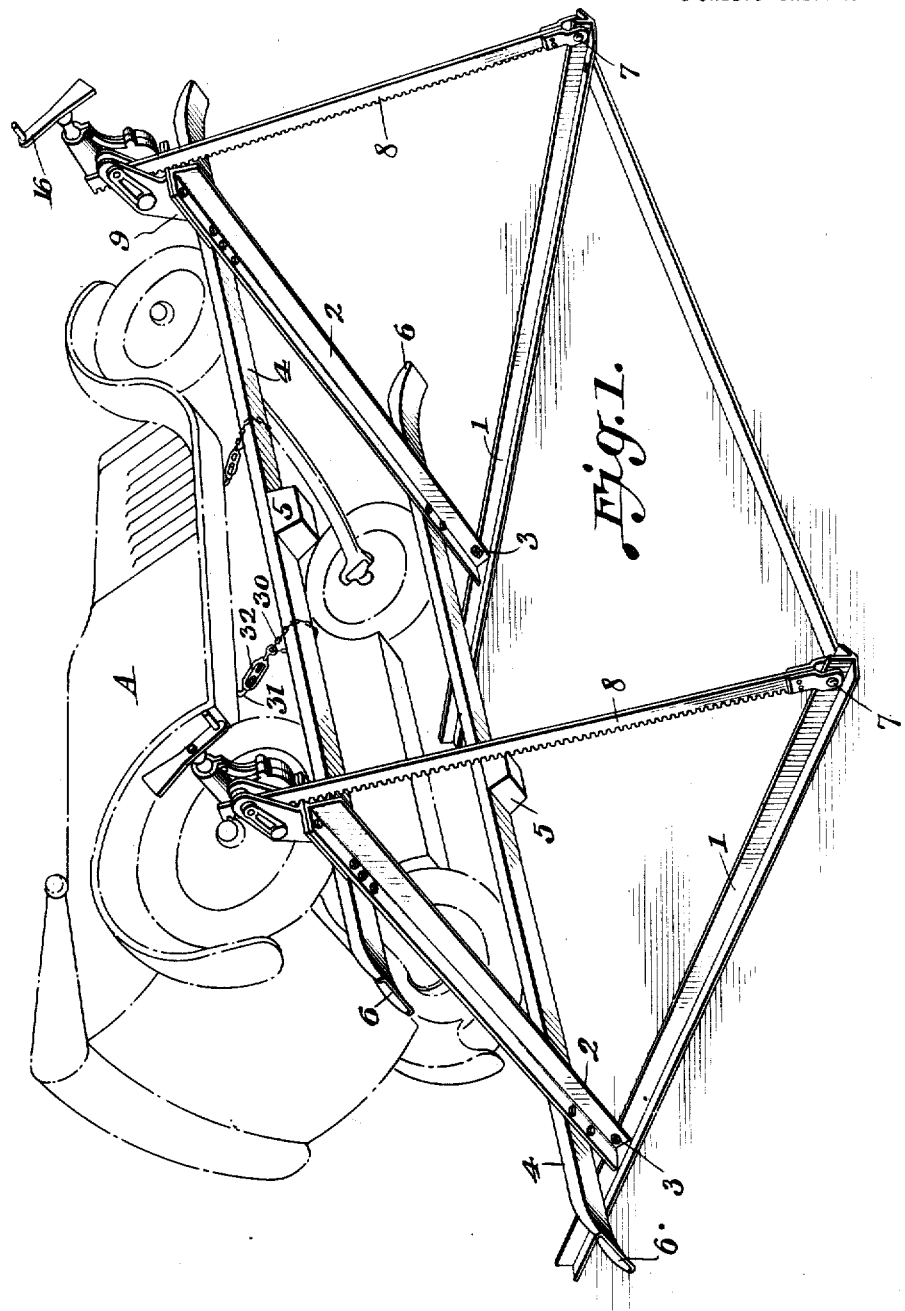

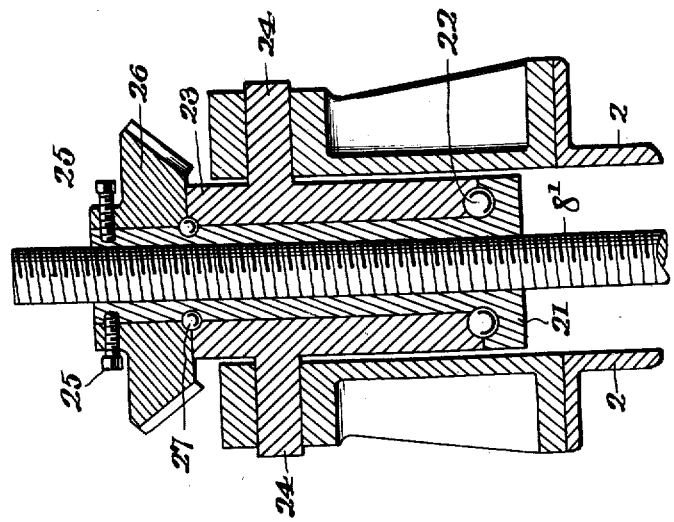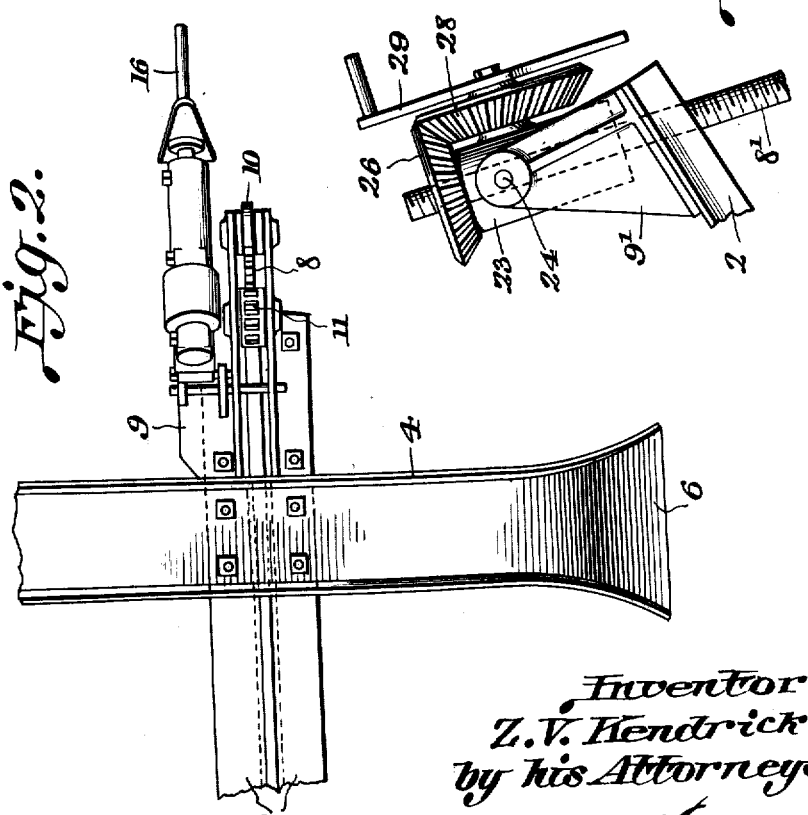

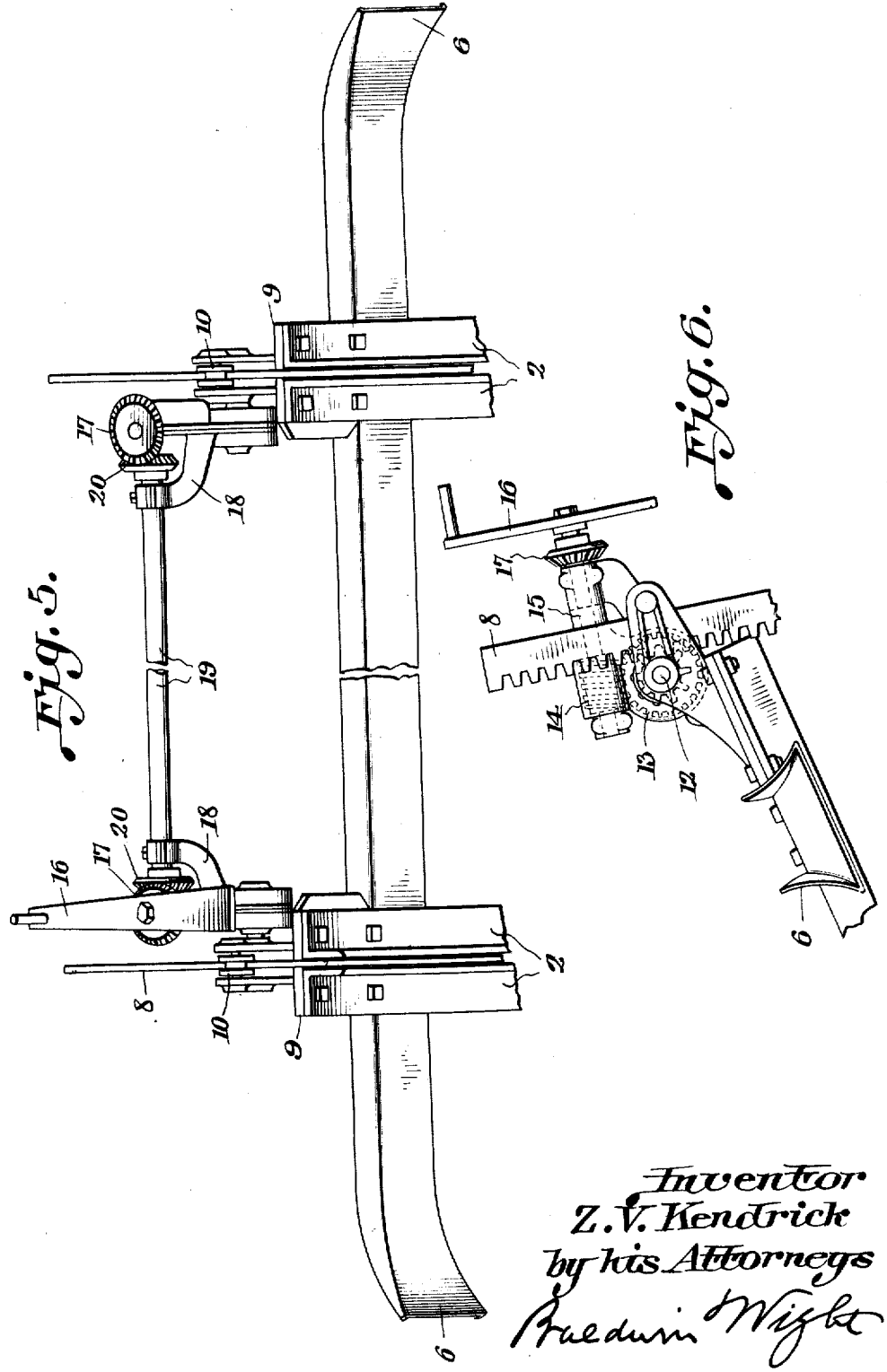

1,436,766

UNITED STATES PATENT OFFICE.

ZEBULON VANCE KENDRICK, OF CHARLOTTE, NORTH CAROLINA.

AUTOMOBILE LIFT.

Application filed November 9, 1921. Serial No. 514,013.

*To all whom it may concern:*

Be it known that I, ZEBULON V. KENDRICK, a citizen of the United States, residing at Charlotte, in the county of Mecklenburg and State of North Carolina, have invented certain new and useful Improvements in an Automobile Lift, of which the following is a full, clear, and exact description.

One object of my invention is to provide a simple and efficient mechanism for lifting and tilting an automobile so that access to its under side may be rendered easy, thereby permitting repairs, painting, oiling and the like to be performed conveniently. The mechanism may also be used for display purposes when it is desired to expose the parts ordinarily hidden beneath the body of the machine.

Another object is to provide a mechanism of the character described which will be portable and self contained, and which may be located wherever a substantially level space is available, requiring no particular foundation or previous construction work for its employment.

Other objects will be apparent from the following detailed description and appended claims.

In the drawings:

Figure 1 is a perspective view of the device in operated position, with an automobile indicated in position thereon.

Figure 2 is a top plan view of one of the elevating devices for raising the automobile with its adjacent parts.

Figure 3 is a vertical section of a different form of elevating mechanism.

Figure 4 is a side elevation of the mechanism shown in Figure 3.

Figure 5 is a side elevation disclosing a modification.

Figure 6 is a perspective view of a portion of the structure shown in Figure 5.

The device comprises base members 1 which may be preferably T-shaped angle irons and are adapted to rest on the floor, ground, or any suitable support. Transverse supports 2 are pivoted at 3 to the base members 1, at an appreciable distance from one end. These supports 2 are each preferably constructed as a pair of angle irons, adapted when in normal position to fit, one on each side of the vertical rib of the T-shaped base members. The two angle irons comprising each support 2 are clearly shown in Figures 3 and 5.

Carried by the transverse supports 2 are longitudinally extending track members 4 which have blocks 5 on their under sides near the middle thereof, furnishing an additional support therefor when in normal position. These track members have outwardly and downwardly flared ends 6 enabling the wheels of an automobile to be positioned thereon with ease.

Pivoted at 7 to the opposite end of each base member 1 is a rack bar 8 which normally occupies a substantially vertical position but can move about its pivot as the device is operated. Attached to the outer end of the support 2 is a bracket member 9 having an opening in which the rack bar reciprocates, and a roller 10 engaging the back of the bar to guide it and facilitate its movement. The rack bar is engaged by a pinion 11 on a shaft 12 which carries a worm gear 13 engaging with a worm 14 on a shaft 15 provided with a handle 16. It is obvious that turning the handle 16 will, through the worm gearing, turn the pinion 11 and cause it to travel along the rack bar thereby raising or lowering the frame with the automobile A thereon.

As shown in Figures 1 and 2, the mechanism just described may be attached to the end of each support 2, and two men will be necessary to operate the device conveniently. However, as shown in Figures 5 and 6, the lifting mechanism may be arranged to be operated by one handle. In this case a bevel gear 17 is mounted on each shaft 15. Mounted in arms 18 projecting from the brackets 9 is a shaft 19 carrying bevel gears 20 at its ends that mesh with the gears 17. One handle 16 may therefore be dispensed with, since the motion of one shaft 15 is transmitted through the bevel gears to the other shaft 15, and one man may operate the device.

An alternative form of operating mechanism is shown in Figures 3 and 4. Instead of the rack bar 8 there is employed a threaded shaft 8', which is pivoted at its lower end to the member 1. A travelling nut 21 is mounted on the threaded shaft and supports by ball bearings 22 a sleeve member 23 which has pintles 24 on which is pivoted a bracket 9' that takes the place of the bracket 9 in the first construction. Fastened by set screws 25 to the upper end of the travelling nut 21 is a bevel gear 26 and ball bearings 27 are provided at the point of contact of the nut 21, sleeve 23 and bevel gear 26. Also carried by the sleeve 23 is a bevel gear 28 meshing with the bevel gear 26 and provided with a handle or crank 29 by which it may be turned. An operation of this crank will result in a turning of the bevel gear 26 and a corresponding rotation of the nut 21 which produces a travelling movement thereof and raises or lowers the frame.

The modified form of mechanism shown in Figures 3 and 4 may be substituted either in the structure shown in Figures 1 and 2 where two cranks are necessary, or in that disclosed in Figures 5 and 6 where only one crank is employed.

Any desired means may be employed for fastening the automobile to the lifting frame, but I prefer to use one or more chains 30 having hooks 31 at each end and an interposed turnbuckle 32. One hook is hooked over any suitable part of the chassis, the chain passed around the longitudinal member 4 and hooked on itself. It is then tightened by the turnbuckle as desired.

It is noted that the base members 1 project considerably beyond the pivot points 3 where the supports 2 are attached thereto. This obviates any danger of the machine's overturning when lifted to or beyond the position shown in Figure 1.

The various frame members are fastened together with bolts, and the device is therefore easily taken apart for transportation or storage. With the exception of the casting containing the gear mechanism, all parts are preferably made of steel, and are therefore strong and durable.

I claim as my invention:

1. In an automobile lift, the combination of base members, each base member having a frame member pivoted thereto adjacent one end and a lifting member pivoted thereto adjacent the other end, longitudinal track members rigidly carried by said frame members, mechanism carried by said frame members at their free ends and cooperating with said lifting members, and means for operating said mechanism to raise and lower the frame members.

2. In a automobile lift, the combination of stationary base members, each base member having a frame member pivoted thereto adjacent one end and a lifting member pivoted thereto adjacent the other end, longitudinal track members having depressed flaring ends rigidly secured to said frame members, brackets carried by said frame members at their free ends, mechanism supported by said brackets and cooperating with said lifting members, and manually operable means for operating said mechanism to raise and lower the frame members.

3. In an automobile lift, the combination of stationary base members, each base member having a frame member pivoted thereto adjacent one end and a vertical lifting member pivoted thereto adjacent its other end, longitudinal track members rigidly carried by said frame members, the frame members and track members constituting a lift frame for the automobile, a bracket carried by each frame member at its free end, and mechanism carried by said bracket and geared to said lifting member for raising and lowering the frame upon the operation of said mechanism.

4. In an automobile lift, the combination of base members, each base member having a frame member pivoted thereto adjacent one end and a threaded shaft pivoted thereto adjacent the other end, longitudinal track members rigidly carried by said frame members, a threaded travelling nut engaging each threaded shaft, a sleeve carried by said nut and having pintles thereon, a bracket member supported by said pintles and connected to said frame member, and means for turning said nut and thereby raising and lowering the frame members.

5. In an automobile lift, the combination of a lift frame, a threaded shaft, a travelling nut engaging the same, a sleeve supported by said nut, interposed ball bearings between said sleeve and nut, a bevel gear rigidly connected to said nut, pintles carried by said sleeve and supporting the lift frame, and means for operating said bevel gear to raise and lower said frame.

In testimony whereof, I have hereunto subscribed my name.

ZEBULON VANCE KENDRICK.